Figure 1:
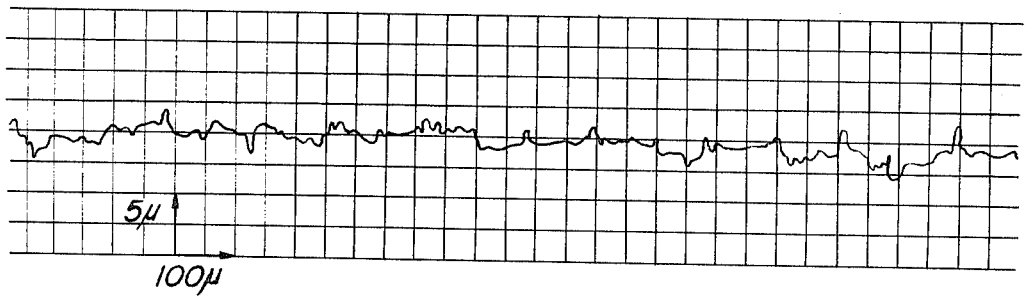

United States Patent [19]

Oda et al.

[11] 4,222,978

[45] Sep. 16, 1980

[54] METHOD FOR PRODUCING POLYCRYSTALLINE TRANSLUCENT ALUMINA HAVING AN EXCELLENT IN-LINE TRANSMISSION

[75] Inventors: Isao Oda, Nagoya; Koichiro Maekawa, Ichinomiya, both of Japan

[73] Assignee: NGK Insulators Ltd., Nagoya, Japan

[21] Appl. No.: 38,771

[22] Filed: May 14, 1979

[30] Foreign Application Priority Data

May 12, 1978 [JP] Japan .................................. 53-55459

[51] Int. Cl.$^2$ .............................................. C04B 35/10
[52] U.S. Cl. ....................................... 264/65; 264/66; 264/101; 220/2.1 R; 106/73.4; 423/625
[58] Field of Search ..................... 220/2.1 R; 313/221; 106/73.4; 423/625; 264/65, 66, 101

[56] References Cited

U.S. PATENT DOCUMENTS

| | | | |
|---|---|---|---|
| Re. 27,083 | 3/1971 | Klingler et al. ....................... | 423/625 |
| 3,026,210 | 3/1962 | Cohle ................................... | 423/625 |
| 3,792,142 | 2/1974 | Kobayashi et al. ................. | 423/625 |
| 3,834,915 | 9/1974 | Cleveland et al. ................ | 220/2.1 R |
| 3,935,495 | 1/1976 | Scott et al. ........................... | 313/221 |
| 4,031,177 | 6/1977 | Aurial et al. ........................... | 264/65 |
| 4,150,317 | 4/1979 | Laska et al. ......................... | 313/221 |
| 4,169,875 | 10/1979 | Laska et al. ......................... | 106/73.4 |

FOREIGN PATENT DOCUMENTS

| | | | |
|---|---|---|---|
| 2810265 | 9/1978 | Fed. Rep. of Germany .......... | 106/73.4 |
| 1443741 | 7/1976 | United Kingdom ..................... | 423/625 |

OTHER PUBLICATIONS

Cahoon et al., "J. of the American Ceramic Soc.", vol. 39, 1956, pp. 337-344.

*Primary Examiner*—Herbert T. Carter
*Attorney, Agent, or Firm*—Stevens, Davis, Miller & Mosher

[57] ABSTRACT

Polycrystalline translucent alumina having an average grain size of alumina crystal grain being not smaller than 20μ and an average surface roughness of the fired body being not larger than 1/10 of the maximum grain size of alumina crystal grain and capable of being used for an envelope of a high pressure vapor discharge lamp, which is produced by shaping alumina composition powders consisting mainly of alumina into a given shape, primarily firing the shaped body under vacuum or in an atmosphere of hydrogen gas or dissociated ammonia gas at a temperature within 1,500° C. and then secondarily firing the primarily fired body at a temperature of 1,650°–1,900° C., at least the temperature from 1,400° C. to 1,700° C. being raised at a rate of not lower than 200° C./hr.

2 Claims, 2 Drawing Figures

METHOD FOR PRODUCING POLYCRYSTALLINE TRANSLUCENT ALUMINA HAVING AN EXCELLENT IN-LINE TRANSMISSION

The present invention relates to polycrystalline translucent alumina having an excellent in-line transmission, a method for producing said alumina and a high pressure vapor discharge lamp obtained by using said alumina.

As the prior methods for producing polycrystalline translucent alumina, a method wherein to a finely divided alumina having a high purity is added a small amount of MgO and the resulting mixture is fired at a temperature of higher than 1,700° C. preferably 1,800°–1,950° C. under hydrogen atmosphere (U.S. Pat. No. 3,026,210), a method wherein $La_2O_3$ and $Y_2O_3$ are added in addition to MgO and the resulting mixture is fired, and the like, have been known. Thus, the addition of MgO, $La_2O_3$ and $Y_2O_3$ are effective for lowering the firing temperature (U.S. Pat. No. 3,792,142). However, in any case, the crystal grains of alumina sintered body is relatively fine, so that the in-line transmission is low and, for example, when such an alumina is used for an envelope of a high pressure vapor discharge lamp, a satisfactory lamp efficiency (lumen/watt, shown by lm/W hereinafter) is not obtained.

Furthermore, in order to increase the in-line transmission, a method wherein the fired surface of polycrystalline translucent alumina is chemically polished with a molten fluxing agent, has been recently proposed (U.S. Pat. No. 3,935,495). According to this method, in order to remove the unevenness of the fired surface of alumina sintered body, the fired surface of alumina is smoothened by means of alkali metal salts of boric acid to increase the in-line transmission, whereby the lamp efficiency of the high pressure vapor discharge lamps can be improved, but in this method it is necessary to treat the surface of the alumina sintered body is chemically treated with a molten salt having a high corrosive property, such as sodium borate, so that the step becomes complicated and the cost of the product becomes high. Although polycrystalline translucent alumina more improves the in-line transmission as the grain size becomes larger but the surface roughness of the fired body also becomes larger, so that the large surface roughness of the fired body becomes the cause of the scattering of light and when such an alumina is used as the envelope of the high pressure vapor discharge lamp, the lamp efficiency is lowered, so that the surface roughness is preferred to be as small as possible. Accordingly, the development of the polycrystalline translucent alumina having an excellent lamp efficiency, wherein the grain size is enlarged to a certain degree and the surface roughness of the fired body is made small, has been strongly demanded.

The present invention has been attempted to solve these prior problems and has firstly obtained polycrystalline translucent alumina having a high in-line transmission and an excellent lamp efficiency by making the surface roughness of the fired polycrystalline translucent alumina very fine and the grain size of the alumina crystal grains relatively larger.

The present invention consists in polycrystalline translucent alumina having an anverage grain size of alumina crystal grains of not smaller than $20\mu$ and an average surface roughness of the fired body which is not larger than 1/10 of the maximum grain size of alumina crystal grains, in a method for producing such an alumina and in a high pressure vapor discharge lamp.

That is, it has been found that polycrystalline translucent alumina having a particularly excellent lamp efficiency can be obtained by firing the compounded powders consisting mainly of alumina under the particularly defined firing conditions to make the grain size of alumina larger to a certain degree and the surface roughness very fine and the average surface roughness of the fired body to be not larger than 1/10 of the maximum grain size of alumina crystal grains.

Then, an explanation will be made with respect to a method for producing the polycrystalline translucent alumina of the present invention.

To $\alpha$-alumina powders having a grain size of not larger than $1\mu$, preferably about $0.1–1\mu$ and a purity of more than 99.5% is added the additive explained hereinafter and the resulting mass was thoughly mixed and the mixture is shaped into a given form and then subjected to firing under vacuum or either atmosphere of hydrogen gas or dissociated ammonia gas.

The firing process is carried out as follows.

The primary firing is carried out maintaining a temperature within 1,500° C. preferably 1,300°–1,500° C. for 1–3 hours or by raising the temperature at a rate of about 50° C./hr within the temperature range of 1,300°–1,500° C., and then the secondary firing is carried out by rapidly raising the temperature at a raising rate of not lower than 200° C./hr, preferably 300° C./hr–1,000° C./hr at least within the temperature range of 1,400°–1,700° C. then maintaining a temperature of 1,650°–1,900° C. for 1–15 hours or raising the temperature at a rate of not lower than 200° C./hr, preferably 300° C./hr–1,000° C./hr, or at a slow rate of 50° C./hr within the temperature range of 1,650°–1,900° C.

The most important fact for controlling the surface roughness and the grain size of polycrystalline translucent alumina by the production method of the present invention is to select the temperature raising rate between 1,400° C. and 1,700° C. It is particularly important in order to make the surface roughness fine and improve the in-line transmission that the temperature raising rate at least between 1,400° C. and 1,700° C. is not lower than 200° C./hr and as mentioned above, the preferable temperature raising rate is 300° C./hr–1,000° C./hr.

As the additive, magnesia alone, magnesia and yttrium oxide, magnesia and calcium oxide and the like are preferable but it is most preferable to add lanthanum oxide and yttrium oxide are concurrently added together with magnesia. An amount of the additive in this case is preferred to be 0.01–0.2% by weight of each of magnesia, lanthanum oxide and yttrium oxide in view of the improvement of the transmission. As the starting alumina powders, use may be made of $\alpha$-alumina or $\gamma$-alumina and in $\gamma$-alumina case, it is necessary to previously calcine said alumina at a temperature of 1,150° C.–1,300° C. in air to make the grain size to be about $0.01–1\mu$. Then, it is preferable in order to make the surface roughness of the fired body uniform in macroview, that after the compounded powders are shaped into a given shape, the surface of the shaped body is smoothened by a lathe and the like.

The reason of the limitation of the present invention will be explained hereinafter.

When the average grain size of alumina crystal grains is smaller than 20μ, the scattering of light due to grain boundary in the sintered body becomes larger and the in-line transmission lowers, so that the average grain size must be not smaller than 20μ. Furthermore, when the average surface roughness of the fired body is larger than 1/10 of the maximum grain size of alumina crystal grains, the scattering of light due to the fired body surface becomes larger and the in-line transmission lowers, so that the average surface roughness of the fired body must be not larger than 1/10 of the maximum grain size of alumina crystal grain.

Moreover, when the temperature raising rate at least between 1,400° C. and 1,700° C. is slower than 200° C./hr, the average surface roughness of the fired body becomes larger together with the grain growth of alumina crystal grain and the scattering of light at the fired body surface increases, so that the temperature raising rate between 1,400° C. and 1,700° C. must be not lower than 200° C./hr.

The reason why the temperature range using the raising rate of not lower than 200° C./hr is defined to be at least 1,400°-1,700° C. is as follows. The grain growth of alumina crystal grain is most noticeable at this temperature range and by rapidly increasing the temperature between this temperature range, the surface roughness of the fired body becomes small in spite of occurrence of the grain growth. As the firing atmosphere, it is necessary to use vacuum, hydrogen gas or dissociated ammonia gas in order to remove voids in the sintered body and to improve the in-line transmission. At the temperature of higher than 1,500° C. in the primary firing, alumina crystal grain is grown to a certain degree and the control of the grain growth due to the subsequent firing becomes difficult and an abnormal grain growth occurs, so that the in-line transmission lowers and such a temperature is not preferable. When the secondary firing is carried out at a temperature of lower than 1,650° C., the satisfactory dense product cannot be obtained, while when such a temperature is higher than 1,900° C., the crystal growth is noticeable and the grain boundary breakage occurs, so that such a temperature is not preferable.

Figure 2:
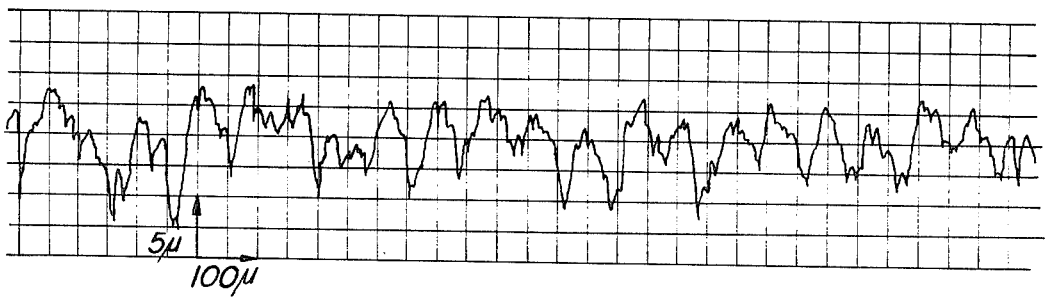

For better understanding of the invention, reference is taken to the accompanying drawings, wherein:

FIG. 1 is a curve showing the surface roughness of the fired body of the polycrystalline alumina according to the present invention; and FIG. 2 is a curve showing the surface roughness of the fired body of a conventional product.

The following example is given for the purpose of illustration of this invention and is not intended as limitation thereof.

EXAMPLE

A tube-shaped polycrystalline translucent alumina having a length of 114 mm, an outer diameter of 9.50 mm and a thickness of 0.8 mm was produced under the conditions as described in the following table. α-alumina was used as starting alumina material.

The average surface roughness of the fired body, the maximum grain size and average grain size of alumina crystal grain, the in-line transmission, the lamp efficiency when a high pressure sodium vapor discharge lamp of 400 W using such a tube was produced, and the like were measured and the results are shown in the following table.

As comparative samples, two polycrystalline translucent alumina tubes, in which the average surface roughness of the fired body is larger than 1/10 of alumina crystal grain, were produced and the results of these tubes are shown in the following table. Furthermore, the properties of the conventional product are shown in the following table.

The surface roughness of the fired body was measured by means of a meter for measuring the surface shape (made by TOKYO SEIMITSU K.K.) Surfcom 60B following to a process for measuring the surface roughness of JIS B0601 (1970), in which an average value of ten points of standard length 1 mm along the tube axial direction was determined.

The maximum grain size and the average grain size of alumina crystal grains were determined through the microscopic observation of the fired body surface.

The in-line transmission was measured as follows. The tube was divided into two parts in the axial direction and the ratio of intensity of the incident light and the transmitted light when light of a wave length of 600 nm (nonameter) was entered from a concave surface of the tube by using a spectrophotometer 323 type (made by Hitachi Seisakusho K.K.) was determined. In this sepctrophotometer 323 type, a tungsten lamp was used as a light source and a photomultiplier was used as a light receiving portion.

The value of the lamp efficiency was determined by dividing the whole luminous flux of the high pressure sodium lamp of 400 W using these tubes with 400.

Table

| | Sample No. | Additive MgO (%) | $La_2O_3$ (%) | $Y_2O_3$ (%) | Primary firing | Secondary firing | Firing condition Temperature raising rate between the primary firing and the secondary firing (°C./Hr) | Atmosphere gas | Average roughness of the fired body (μ) | Grain size of alumina Maximum grain size (μ) | Average grain size (μ) | In-line transmission (%) | Lamp efficiency (lm/w) |
|---|---|---|---|---|---|---|---|---|---|---|---|---|---|
| Present invention | 1 | 0.1 | 0.05 | 0.05 | 1,300° C. 3 Hr | 1,700° C. 5 Hr | 200 | $H_2$ | 6 | 100 | 70 | 6.8 | 130 |
| | 2 | 0.1 | 0.05 | 0.05 | 1,300° C. 3 Hr | 1,700° C. 5 Hr | 500 | A* | 3 | 70 | 45 | 6.9 | 130 |
| | 3 | 0.1 | 0.05 | 0.05 | 1,300° C. 3 Hr | 1,700° C. 5 Hr | 1,000 | Vacuum | 5 | 85 | 65 | 6.0 | 128 |
| | 4 | 0.15 | 0.1 | 0.1 | 1,400° C. 2.5 Hr | 1,720° C. 4 Hr | 300 | A* | 7 | 120 | 80 | 6.5 | 129 |
| | 5 | 0.15 | 0.1 | 0.1 | 1,400° C. 2.5 Hr | 1,720° C. 4 Hr | 500 | $H_2$ | 4 | 90 | 60 | 6.8 | 130 |
| | 6 | 0.15 | 0.1 | 0.1 | 1,400° C. 2.5 Hr | 1,720° C. 4 Hr | 1,000 | A* | 5 | 95 | 65 | 5.8 | 128 |

Table-continued

|  | Sample No. | Additive MgO (%) | Additive La$_2$O$_3$ (%) | Additive Y$_2$O$_3$ (%) | Firing condition Primary firing | Firing condition Secondary firing | Temperature raising rate between the primary firing and the secondary firing (°C./Hr) | Atmosphere gas | Average roughness of the fired body ($\mu$) | Grain size of alumina Maximum grain size ($\mu$) | Grain size of alumina Average grain size ($\mu$) | In-line transmission (%) | Lamp efficiency (lm/w) |
| --- | --- | --- | --- | --- | --- | --- | --- | --- | --- | --- | --- | --- | --- |
| Comparative sample | 7 | 0.1 | 0.05 | 0.05 | 1,300° C. 3 Hr | 1,700° C. 5 Hr | 50 | H$_2$ | 15 | 130 | 85 | 2.9 | 119 |
| | 8 | 0.15 | 0.1 | 0.1 | 1,400° C. 2.5 Hr | 1,720° C. 4 Hr | 150 | H$_2$ | 11 | 100 | 75 | 2.7 | 119 |
| Conventional sample | 9 | — | — | — | — | — | — | H$_2$ | 11 | 80 | 30 | 1.6 | 117 |

*A: Dissociated ammonia gas.

As seen from the results of the above table, all the average grain sizes of alumina according to the present invention are larger than 20$\mu$ and relatively large but the average surface roughness of the fired body is not larger than 1/10 of the maximum grain size of alumina crystal grain, so that the in-line transmission is high and therefore the lamp efficiency is high. On the other hand, in any one of the comparative samples and the conventional sample, the average surface roughness of the fired body is larger than 1/10 of the maximum grain size of alumina crystal grain, so that the in-line transmission is insufficient and therefore the lamp efficiency is low.

The measured result of the surface roughness of the fired body of the sample No. 5 according to the present invention is shown in FIG. 1 and the result of the sample No. 9 of the conventional sample is shown in FIG. 2.

From the measured results of FIG. 1 and FIG. 2, it can be seen that the product obtained in the present invention is very fine in the surface roughness and is smooth.

As mentioned above, the present invention can provide polycrystalline translucent alumina wherein the surface roughness of the fired body is very small and the grain size of alumina crystal grain is relatively large and the average surface roughness is not larger than 1/10 of the maximum grain size of alumina crystal grain, by heating fine alumina compounded powders having a high purity at a temperature raising rate of not lower than 200° C./hr at least within the temperature range from 1,400° C. to 1,700° C. and as the result, the polycrystalline translucent alumina having a high in-line transmission can be obtained. When such an alumina is used for a high pressure vapor discharge lamp, the lamp efficiency is improved and the alumina is particularly useful as an envelope for a high pressure vapor discharge lamp.

What is claimed is:

1. A method for producing a polycrystalline translucent alumina envelope for a high pressure vapor discharge lamp, which comprises shaping compounded alumina powders having a grain size not larger than 1$\mu$ and a purity of more than 99.5% into a given shape, primarily firing the shaped body under vacuum or in an atmosphere of hydrogen gas or dissociated ammonia gas at a temperature within the range 1,300°–1,500° C. and then secondarily firing the primarily fired body at a temperature of 1,650°–1,900° C., for a period of 1–15 hours at least the temperature from 1,400° C. to 1,700° C. being raised at a rate of not lower than 200° C./hr.

2. The method as claimed in claim 1, wherein the compounded powders are prepared by adding 0.01–0.2% by weight of MgO, 0.01–0.2% by weight of La$_2$O$_3$ and 0.01–0.2% by weight of Y$_2$O$_3$ to alumina powders having a grain size of not larger than 1$\mu$ and a purity of more than 99.5%.

* * * * *